(12) United States Patent
Ohama et al.

(10) Patent No.: US 8,908,233 B2
(45) Date of Patent: Dec. 9, 2014

(54) IMAGE PROCESSING APPARATUS (71) Applicants: Takashi Ohama, Iwakura (JP); Yoshinori Osakabe, Seto (JP)

(72) Inventors: Takashi Ohama, Iwakura (JP); Yoshinori Osakabe, Seto (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 13/935,608

(22) Filed: Jul. 5, 2013

(65) Prior Publication Data
US 2014/0009052 A1 Jan. 9, 2014

(30) Foreign Application Priority Data
Jul. 6, 2012 (JP) ................................ 2012-152500

(51) Int. Cl.
*H04N 1/21* (2006.01)
*B41J 29/13* (2006.01)

(52) U.S. Cl.
CPC ...................................... *B41J 29/13* (2013.01)
USPC ........... 358/296; 358/474; 358/498; 399/110; 271/10.01

(58) Field of Classification Search
CPC G06F 1/183; B65H 2220/01; B65H 2220/02; B65H 2220/03; B65H 2511/51; B65H 2511/11; B65H 2511/12; B65H 2513/51; B65H 2513/512; B65H 2513/514; B65H 2513/53; B65H 2701/1311; B65H 2701/1313
USPC .................. 358/498, 474, 496, 497, 486.296; 271/10.01, 10.02, 10.11, 114, 223, 271/4.01; 399/110, 111, 119, 120, 117, 399/121, 258, 262, 74, 122, 167, 176, 279, 399/299, 320, 329, 331, 367, 381
See application file for complete search history.

(56) References Cited

U.S. PATENT DOCUMENTS

| | | | |
|---|---|---|---|
| 7,775,656 B2 * | 8/2010 | Sugiyama et al. | 347/104 |
| 7,855,814 B2 | 12/2010 | Osakabe et al. | |
| 7,887,044 B2 * | 2/2011 | Uchino et al. | 271/121 |
| 7,978,380 B2 * | 7/2011 | Ohama et al. | 358/494 |
| 8,038,248 B2 * | 10/2011 | Uchino et al. | 347/16 |
| 8,047,534 B2 * | 11/2011 | Sugiyama et al. | 271/167 |
| 8,205,956 B2 * | 6/2012 | Kawamata et al. | 347/16 |
| 8,405,855 B2 * | 3/2013 | Asakawa | 358/1.15 |
| 8,477,391 B2 * | 7/2013 | Shimmachi et al. | 358/497 |

(Continued)

FOREIGN PATENT DOCUMENTS

| | | |
|---|---|---|
| JP | 10-123630 A | 5/1998 |
| JP | 11-305358 A | 11/1999 |

(Continued)

*Primary Examiner* — Negussie Worku
(74) *Attorney, Agent, or Firm* — Banner & Witcoff, Ltd.

(57) ABSTRACT

An image processing apparatus includes a cover configured to be movable between a first position, in which the top of the main body is covered, and a second position, in which the top of the main body is exposed; a supporting member configured to vertically move with respect to the main body so that the rotation center of the cover is moved between an ascent position and a descent position; a cam configured to rotate together with the cover such that a cam surface abuts on the main body, thereby vertically moving the supporting member, wherein the cam has a shape to displace the rotation center to the descent position when then the cover rotates to the first position and to displace the rotation center to the ascent position when the cover rotates to the second position so that interference of the cover is suppressed.

9 Claims, 6 Drawing Sheets

(56) References Cited

U.S. PATENT DOCUMENTS

| | | | |
|---|---|---|---|
| 8,564,818 B2 * | 10/2013 | Nakamura | 358/1.15 |
| 8,570,562 B2 * | 10/2013 | Kim | 358/1.15 |
| 8,582,181 B2 * | 11/2013 | Motoyama | 358/404 |
| 8,582,184 B2 * | 11/2013 | Oshima | 358/474 |
| 8,605,342 B2 * | 12/2013 | Akimatsu | 358/498 |
| 8,665,481 B2 * | 3/2014 | Shimizu | 358/1.15 |
| 8,693,020 B2 * | 4/2014 | Maeda | 358/1.13 |
| 2007/0201109 A1 | 8/2007 | Osakabe et al. | |
| 2011/0049791 A1 | 3/2011 | Osakabe | |

FOREIGN PATENT DOCUMENTS

| | | |
|---|---|---|
| JP | 2006-023333 A | 1/2006 |
| JP | 2009-071804 A | 4/2009 |
| JP | 4306686 B2 | 8/2009 |
| JP | 2011-046497 A | 3/2011 |
| JP | 4672570 B2 | 4/2011 |

* cited by examiner

IMAGE PROCESSING APPARATUS

CROSS-REFERENCE TO RELATED APPLICATION

This application claims priority from Japanese Patent Application No. 2012-152500 filed on Jul. 6, 2012, the entire subject matter of which is incorporated herein by reference.

TECHNICAL FIELD

This disclosure relates to an image processing apparatus.

BACKGROUND

There is an image processing apparatus which includes a first image processing unit that is provided at an upper portion of the apparatus and reads images of documents, and a second image processing unit that is provided at a lower portion of the apparatus and forms the images on recording media (see, for example, JP-A-2011-46497).

In a case of an image processing apparatus disclosed in JP-A-2011-46497, as the first image processing unit provided at the upper portion of the apparatus, a flatbed type image scanner device is incorporated, and at the top of the image scanner device, a top cover is provided. This top cover is connected to the main body of the apparatus through a pair of hinge members such that the top cover can rotate between a position to cover a platen where documents to be read is mounted, and a position to expose the platen.

Also, at the rear surface (back) of the main body of the apparatus, at a position between the above-mentioned pair of hinge members, an opening is formed for manual paper feed, and for this opening, a lid member is provided to be openable and closable. This lid member prevents or suppresses foreign materials and dust from entering the opening when the opening is closed, and is used as a paper feeding tray when the opening is open such that it is possible to feed recording media to the second image processing unit through the opening, and form images on the recording media.

SUMMARY

However, in the above described image processing apparatus, in order to make the apparatus thinner, it is desired to set the vertical position of the top cover which is at the uppermost portion, and the vertical positions of the hinge members which become the rotation center of the top cover as low as possible.

Meanwhile, with respect to the lid member of the rear surface (back) of the main body of the apparatus, since the lid member is opened or closed with the vicinity of the upper end of the lid member held by a hand, if the position of the upper end of the lid member is excessively low, for a user who is on the front side of the apparatus, the opening or closing operation becomes difficult. For this reason, it is also desired to set the position of the upper end of the lid member as high as possible.

However, if the vertical positions of the hinge members are set too low and the position of the upper end of the lid member is set too high, the rotation center of the top cover and the free end of the lid member (an end portion on the side away from the rotation center) approach each other. Therefore, there is a problem that interference between the top cover and the lid member might occur according to the shapes and operation situations of the top cover and the lid member.

As a measure for solving that problem, for example, there is a method of cutting portions of the top cover and the lid member which will be positioned to interfere with each other if the top cover and the lid member are operated, thereby suppressing interference between the top cover and the lid member. However, if those portions which will be positioned to interfere with each other are functionally important, it is not preferable to easily cut those portions, thereby changing the shape. Therefore, this measure has a problem that it is difficult to cope with the above described problem.

Also, even if the shapes of the top cover and the lid member are not changed, if the rotation center of the top cover and the lid member are disposed to be sufficiently away from each other, it is possible to suppress interference between the top cover and the lid member. However, in order to space the rotation center of the top cover and the lid member sufficiently away from each other, it is necessary either to raise the rotation center of the top cover or to lower the upper end of the lid member. Therefore, it is difficult to improve operability of the lid member while making the apparatus thinner as described above.

This disclosure provides at least an image processing apparatus which is capable of disposing a top cover at a sufficiently low position while disposing the upper end of a lid member at a sufficiently high position when the top cover is closed, and is capable of suppressing interference between the top cover and the lid member from occurring when the top cover is open.

An image processing apparatus of this disclosure includes a main body, a cover, a supporting member, an opening and a cam. The main body comprises a first image processing unit. The cover is configured to be movable between a first position, in which the top of the main body is covered, and a second position, in which the top of the main body is exposed. The supporting member is configured to support the cover in a state where the cover is rotatable to the first position and the second position, and the supporting member configured to vertically move with respect to the main body so that the rotation center of the cover is moved between an ascent position and a descent position. The opening is formed on the main body. The cam is configured to rotate together with the cover such that a cam surface, whose distance from the rotation center of the cam varies according to the rotation angle of the cam, abuts on the main body, thereby vertically moving the supporting member with respect to the main body. The cam has a shape to displace the rotation center to the descent position when then the cover rotates to the first position and to displace the rotation center to the ascent position when the cover rotates to the second position so that interference the cover is suppressed.

According to the image processing apparatus configured as described above, when the top cover is at the first position, it is possible to displace the rotation center of the top cover to the descent position. Therefore, it is possible to make the apparatus thinner as compared to a case where the rotation center of the top cover is always fixed at a position corresponding to the ascent position.

Also, in the image processing apparatus, the shape of the top cover is set to a shape which may interfere with the lid member if it is assumed a state where the top cover has rotated to the second position in a state where the rotation center was at the descent position. However, in order to displace the top cover from the first position to the second position, the cam member displaces the rotation center of the top cover from the descent position to the ascent position.

Accordingly, unlike a case where the rotation center of the top cover is always fixed at a position corresponding to the descent position, it is possible to suppress interference between the top cover and the lid member even if the top cover is displaced to the second position, and thus to suppress the top cover and the lid member from being damaged by that interference. Further, since it is possible to vertically move the supporting members while maintaining that state where the top cover has been displaced to the first position, even in a case where a thick document is mounted on the platen, the top cover can be displaced to the first position in a state where the supporting members have been raised.

BRIEF DESCRIPTION OF THE DRAWINGS

The foregoing and additional features and characteristics of this disclosure will become more apparent from the following detailed descriptions considered with the reference to the accompanying drawings, wherein.

DETAILED DESCRIPTION

Hereinafter, an embodiment of this disclosure will be described as an example. An image processing apparatus to be exemplified in the present embodiment is configured as a multi-function apparatus having various functions such as a scanning function, a printing function, a coping function, and a facsimile transmitting/receiving function. In the following description, with respect to components of the apparatus, their relative positional relationships will be described in brief, referring to an upper side, a lower side, a left side, a right side, a front side, and a rear side shown in the drawings.

[Structure of Multi-Function Apparatus]

Figure 1:
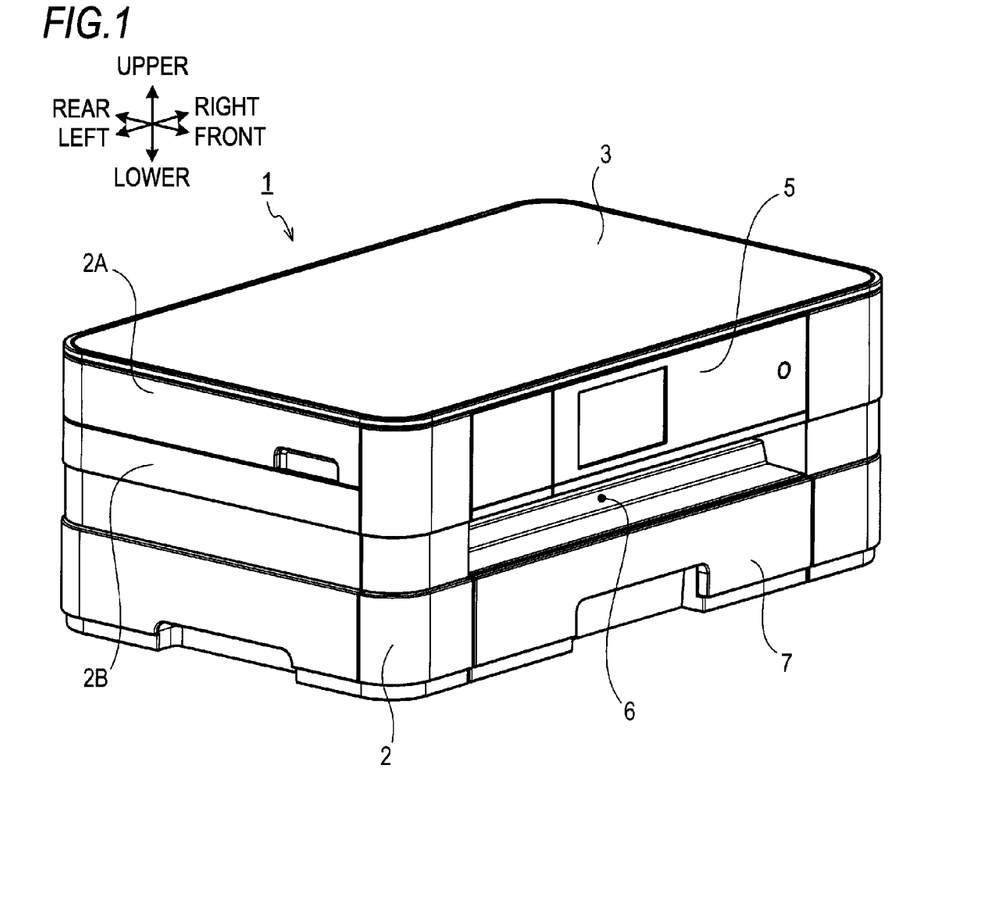
FIG. 1 is a perspective view illustrating an image processing apparatus.

As shown in FIG. 1, a multi-function apparatus 1 includes a main body 2, and a top cover 3 provided on the main body 2. The top cover 3 is configured to be displaceable to a first position to cover the top of the main body 2 and a second position to expose the top of the main body 2. A supporting structure for supporting the top cover 3 such that the top cover is displaceable will be described below in detail.

An operation panel 5 which can be operated by a user is provided on the upper side of the front surface of the main body 2. Also, an outlet 6 is formed below the operation panel 5 such that recording media having images formed in an image forming unit to be described below can be taken out from the outlet 6 after being discharged from the image forming unit. Further, a paper feeding cassette 7 for storing recording media before printing is installed below the outlet 6.

Figure 2:
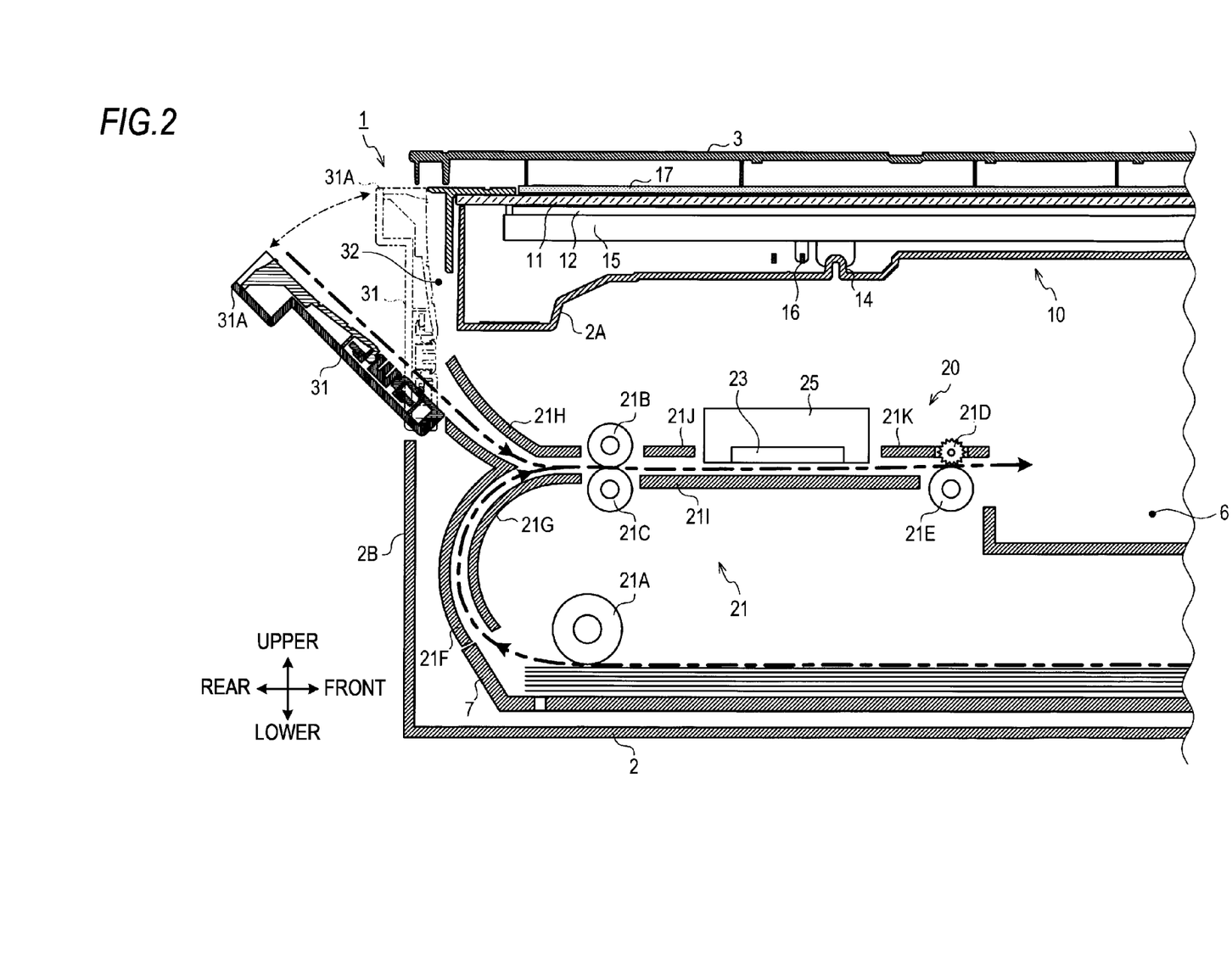
FIG. 2 is a vertical cross-sectional view illustrating the internal structure of the image processing apparatus.
Figure 3A:
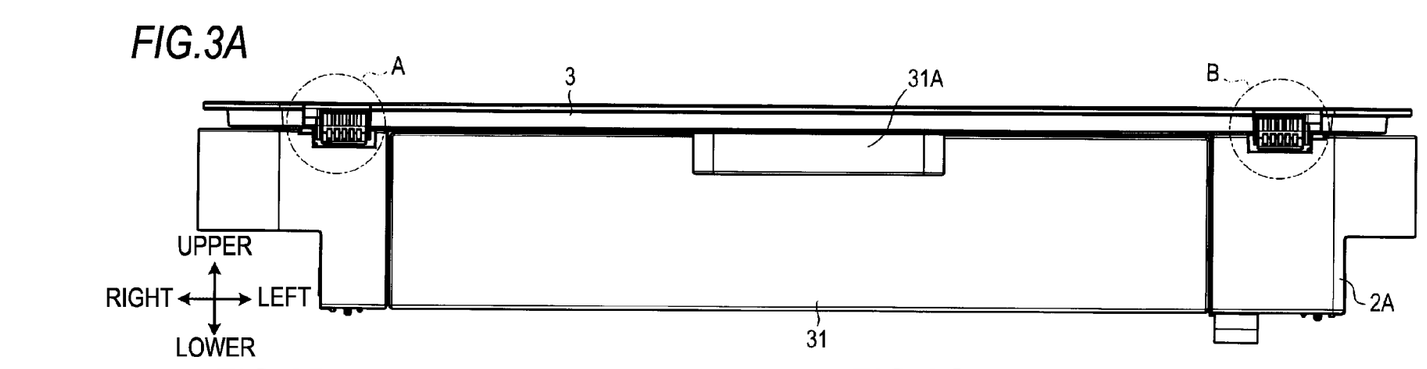
FIG. 3A is a rear view illustrating a first image processing unit.
Figure 3B:
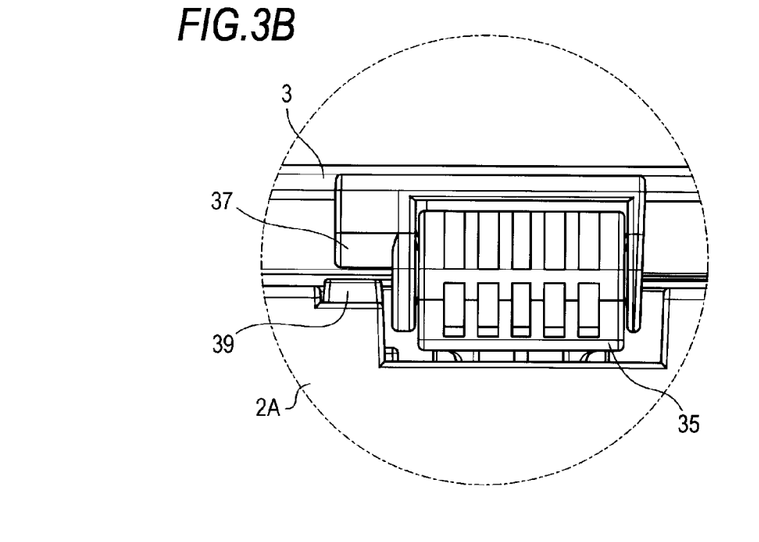
FIG. 3B is an enlarged view of a portion "A"
Figure 3C:
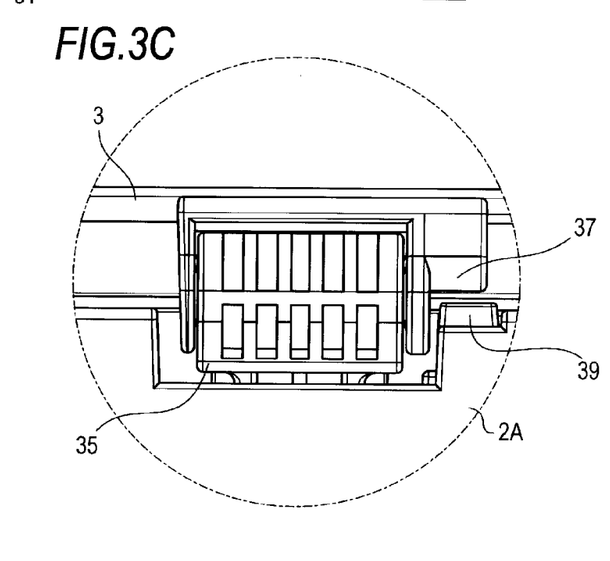
FIG. 3C is an enlarged view of a portion "B".

As shown in FIG. 2, the main body 2 includes an upper unit 2A and a lower unit 2B. The upper unit 2A is configured to be rotatable from a horizontal position shown in FIG. 2 toward a direction, in which its front end side rises with respect to the lower unit 2B, with an axis extending in a left-right direction around the rear ends of the upper unit 2A and the lower unit 2B and serving as the rotation center. If the upper unit 2A is rotated such that the front end side of the upper unit 2A is displaced upward, the opening of the top of the lower unit 2B is opened, whereby it becomes possible to perform maintenance work on each component built in the lower unit 2B.

In the upper unit 2A, a first image processing unit 10 is provided for reading images from documents. The first image processing unit 10 has a configuration as a flatbed type image scanner device, and specifically includes a platen 11 on which documents are mounted, an image sensor 12 (corresponding to an example of a reading unit in this disclosure) that is disposed below the platen 11, and so on. In a case of the present embodiment, the platen 11 is composed of a transparent glass plate, and the image sensor 12 is composed of a contact image sensor (CIS).

The image sensor 12 is installed on a carriage 15 which is movable along guide rails 14 extending in the left-right direction (a direction perpendicular to a paper plane in FIG. 2). The carriage 15 is connected to a timing belt 16 which is circularly driven by a motor (not shown), whereby the image sensor 12 and the carriage 15 are able to reciprocate in the left-right direction inside the upper unit 2A. When a document is read by the image sensor 12, the image sensor 12 reads images of the document mounted on the platen 11 while moving along the bottom surface of the platen 11.

An elastic member 17 is provided on the bottom surface of the top cover 3. In the present embodiment, as the elastic member 17, an elastic laminate having a sponge layer composed of synthetic resin foam, and a synthetic resin film layer provided below the sponge layer is used. When the top cover 3 is displaced to the first position, the elastic member 17 receives a load from the top cover, thereby being elastically deformed. As a result, the elastic member 17 presses the document mounted on the platen 11, thereby bringing the document into close contact with the platen 11.

Meanwhile, in the main body 2 (more specifically, below the first image processing unit 10 inside the lower unit 2B), a second image processing unit 20 is provided for forming images on recording media. The second image processing unit 20 has a configuration as an inkjet type printer device. Specifically, the second image processing unit 20 includes a conveying mechanism 21 for conveying recording media, a recording head 23 for forming images on recording media conveyed along a predetermined conveyance path by the conveying mechanism 21, and so on (the conveying mechanism 21 and the recording head 23 correspond to examples of an image forming unit in this disclosure).

The conveying mechanism 21 includes a plurality of rollers 21A to 21E for sending recording media to the downstream side in the conveyance direction, and a plurality of guide members 21F to 21K for defining a space to be the conveyance path, thereby guiding recording medium sent by the plurality of rollers 21A to 21E, along the conveyance path.

The recording head 23 is mounted on a carriage 25 capable of reciprocating in the left-right direction (a direction perpendicular to the paper plane in FIG. 2). When an image is formed on a recording medium by the recording head 23, the recording medium is conveyed to a position facing the recording head 23 by the conveying mechanism 21, and then an operation of recording an image corresponding to a predetermined number of lines while moving the recording head 23 forth or back, and an operation of conveying the recording medium by a portion corresponding to the predetermined number of lines by the conveying mechanism 21 are repeated, so that the desired image is formed.

In the second image processing unit 20, as the conveyance path for recording media, two conveyance paths can be used. Specifically, in the main body 2, a first conveyance path is configured from the paper feeding cassette 7 to the outlet 6 through the position facing the recording head 23. Further, if a lid member 31 provided on the rear side of the main body 2 is opened to open an opening 32, a second conveyance path is configured from the lid member 31 to the outlet 6 through the position facing the recording head 23.

Also, the first conveyance path and the second conveyance path join on the upstream side relative to the recording head 23 in the conveyance direction, thereby forming a single conveyance path which is used as the first conveyance path and the second conveyance path on the downstream side relative to the joint. Further, the opening 32 has a length in the left-right direction such that recording media having sizes capable of image forming in this disclosure can be inserted. Also, the opening 32 has a length in a vertical direction such that an inlet for the second conveyance path formed by the guide members 21F and 21H is exposed.

The lid member 31 is rotatable around the lower end side of the lid member 31 serving as the rotation center and is displaced to a position to close the opening 32 (a position shown by an alternate long and two short dashes line in FIG. 2), and a position to open the opening 32 (a position shown by a solid line in FIG. 2). Also, at the upper end of the lid member 31, a pull 31A is provided, such that the user can perform an operation of opening or closing the lid member 31 with a finger tip hooked into the pull 31A.

[Supporting Structure of Top Cover]

Subsequently, the supporting structure of the top cover 3 will be described. At positions on both sides of the lid member 31 as seen from the rear side of the multi-function apparatus 1, supporting members 35 are provided to be able to rotate the top cover 3 and support the top cover 3 in a state where the supporting members are vertically movable. Also, the top cover 3 includes a cam member 37 formed integrally with the top cover 3. Further, on the top of the upper unit 2A, an abutting member 39 is provided to form a contact surface with the cam member 37. Although the top cover 3 and the cam member 37 have been formed as one member, they may be configured as separate members, and the cam member 37 may be fixed to the top cover 3 by fixing means such as screws.

The supporting members 35 have bearings 41 as shown in FIGS. 4A to 4D, and hold a rotating shaft 43 formed integrally with the top cover 3, by the bearings 41. The rotating shaft 43 is a portion which becomes the rotation center of the top cover 3, and the rotating shaft 43 is rotatably supported by the bearings 41, such that the top cover 3 is rotatable with respect to the supporting members 35. Also, the supporting members 35 are inserted to insertion portions 45 formed on the rear side of the main body 2 (the upper unit 2A). The insertion portions 45 have a depth in the vertical direction such that the supporting members 35 are supported by the main body 2 in a state where the supporting members 35 are vertically displaceable inside the insertion portions 45.

As shown in FIGS. 5A to 5D, when the top cover 3 is rotated around the rotating shaft 43 serving as the rotation center, the cam member 37 rotates together with the top cover 3. At this time, a cam surface 37A of the cam member 37 on the outer circumferential side of the rotation center abuts on the abutting member 39 provided to the main body 2 (the top of the upper unit 2A).

The cam surface 37A has a shape set such that, when the cam member 37 is rotated, a cam diameter at the contact point between the cam member 37 and the abutting member 39 (a distance from the rotation center of the cam member 37 to the cam surface 37A) varies according to the rotation angle of the cam member 37. Also, the abutting member 39 is fixed to the top of the main body 2 so as not to be displaced; whereas the rotating shaft 43 which is the rotation center of the top cover 3 and the cam member 37 is vertically movable together with the supporting members 35.

Accordingly, if the cam member 37 rotates toward a direction in which the cam diameter at the contact point with the abutting member 39 increases, the supporting members 35, which are vertically movable with respect to the main body 2, rise. Also, if the cam member 37 rotates toward a direction in which the cam diameter at the contact point with the abutting member 39 decreases, the supporting members 35, which are vertically movable with respect to the main body 2, lower.

The abutting member 39 is made of a resin material having a sliding property higher than that of the resin material forming most of the main body 2 or the top cover 3. Specifically, in the case of the present embodiment, the main body 2 and the top cover 3 are made of polystyrene (PS); whereas the abutting member 39 is made of polyacetal (POM). Therefore, as compared to a case where the entire main body 2 is made of polystyrene, it is unlikely cause squeak noise or wear to occur. As the material for forming the abutting member 39, although polyacetal has been used, any other resin materials having sufficient high sliding properties, such as polyamide and other engineering plastics may be used.

Subsequently, concrete operations when the top cover 3 is opened or closed will be described.

In the present embodiment, in a case where the top cover 3 is at the first position (the position to cover the top of the main body 2) (see FIG. 5A), the cam surface 37A is away from the abutting member 39. In this state, since the supporting members 35 are at the descent positions, and the load of the top cover 3 is applied to the elastic member 17, it is possible to improve the effect of the elastic member 17 to bring a document into close contact with the platen 11.

Also, until the cam member 37 reaches a predetermined rotation angle, when the top cover 3 is displaced from the first position to the second position, the cam member 37 does not abut on the abutting member 39 although the top cover 3 is displaced. In the case of the present embodiment, it is assumed that the rotation angle of the cam member 37 when the top cover 3 is at the first position is set to 0 degree (see FIG. 5A), and it is assumed that the rotation angle of the cam member 37 when the top cover 3 is at the second position is set to 90 degrees (see FIG. D). The cam member 37 does not abut on the abutting member 39 even if the top cover 3 is displaced, until the rotation angle of the cam member 37 reaches 19 degrees (see FIG. 5B). For this reason, the cam member 37 does not abut on the abutting member 39 even if the top cover 3 is displaced slightly toward the second position side, and thus it is possible to maintain a state where the load of the top cover 3 is applied to the elastic member 17.

Figure 5A:
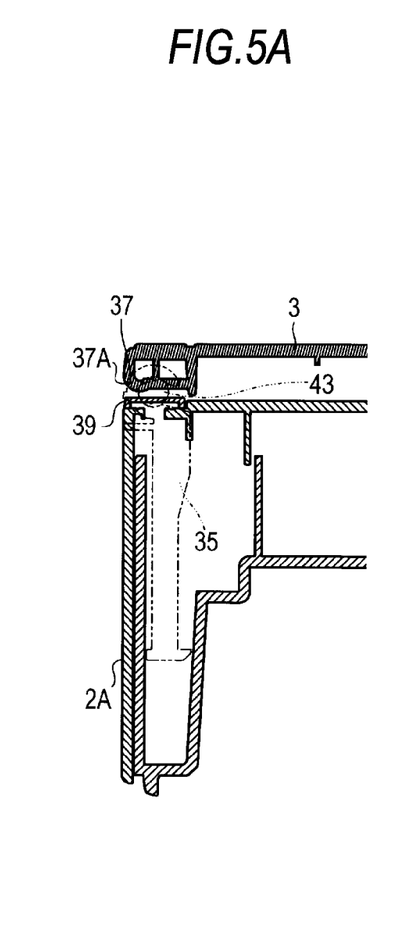
FIGS. 5A to 5D are explanatory views illustrating the positional relationship between the top cover which is opened and closed, and a cam member.
Figure 5B:
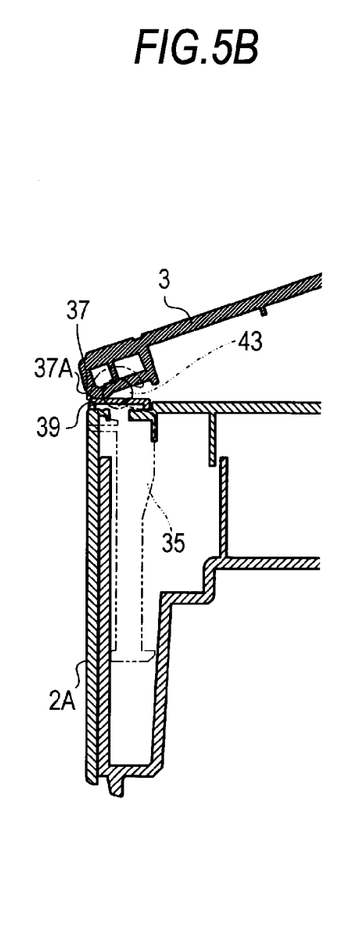
Figure 5C:
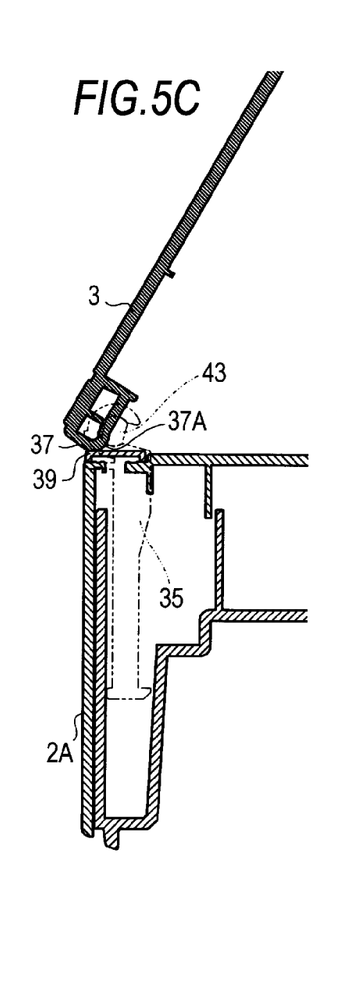
Figure 5D:
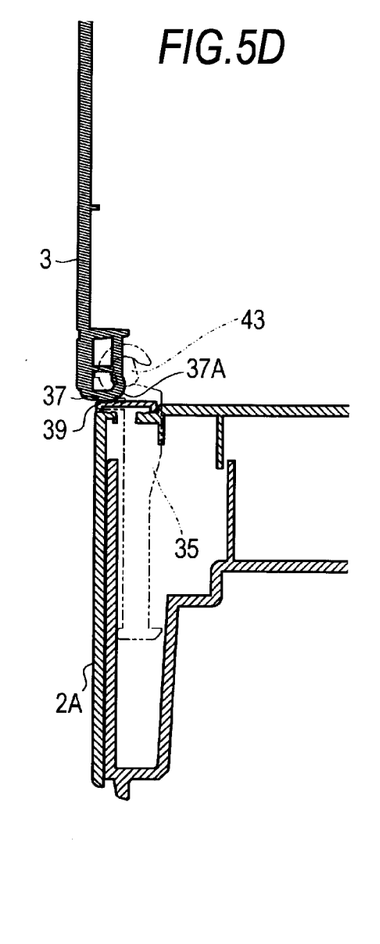

Meanwhile, when the top cover 3 is displaced from the first position to the second position, if the cam member 37 exceeds the predetermined rotation angle (19 degrees in the present embodiment), the cam member 37 abuts on the abutting member 39 (see FIG. 5C). Since the distance from the contact point to the rotation center (the cam diameter) increases as the rotation angle increases, the rotation center of the cam member 37 rises together with the supporting members 35 with respect to the abutting member 39 whose relative position to the main body 2 does not change, whereby the top cover 3 formed integrally with the cam member 37 also rises while rotating with respect to the main body 2. Then, if the top cover 3 finally reaches the second position, the rotation angle of the cam member 37 becomes 90 degrees (see FIG. 5D), and the supporting members 35 reach the ascent positions.

Figure 6A:
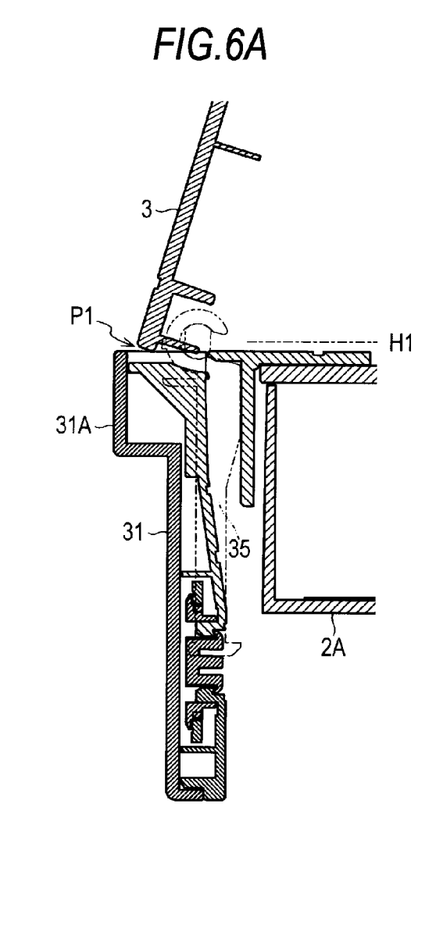
FIGS. 6A to 6C are explanatory views illustrating the positional relationship between the rotation center of the top cover and a lid member.

Here, if the supporting members 35 are configured not to rise from the descent positions, since the rotation center of the top cover 3 does not rise from the descent position H1 as shown in FIG. 6A, when the top cover 3 is displaced to the second position, interference between the top cover 3 and the lid member 31 occurs.

Specifically, before the top cover 3 reaches the second position, at a position P1 shown in FIG. 6A, the top cover 3 collides with the pull 31A of the lid member 31, whereby it is impossible to further open the top cover 3. In other words, in the present embodiment, in order to improve the operability of the lid member 31, at the upper end of the lid member 31, the pull 31A is formed to protrude toward the rear side of the apparatus. Therefore, interference between the top cover 3 and the lid member 31 (the pull 31A) occurs.

Figure 6B:
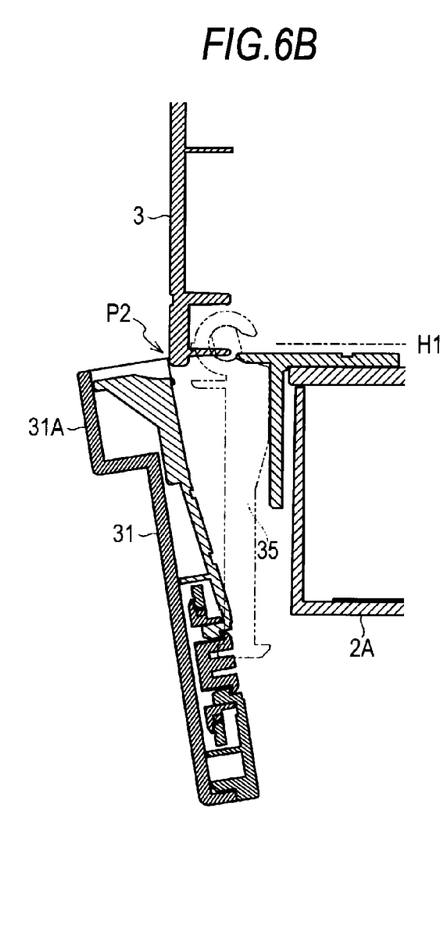

Also, in a case where the rotation center of the top cover 3 does not rise from the descent position H1, even in a state where the top cover 3 is at the second position as shown in FIG. 6B, if the lid member 31 is operated, interference between the top cover 3 and the lid member 31 occurs.

Specifically, in a case where the top cover 3 in its open state moves to the second position, if the lid member 31 is closed, at a position P2 shown in FIG. 6B, the upper end of the lid member 31 collides with the top cover 3, whereby it is impossible to further close the top cover 3. Therefore, if interference as shown in FIGS. 6A and 6B occurs, it is feared that the top cover 3 and the lid member 31 might be damaged.

Figure 6C:
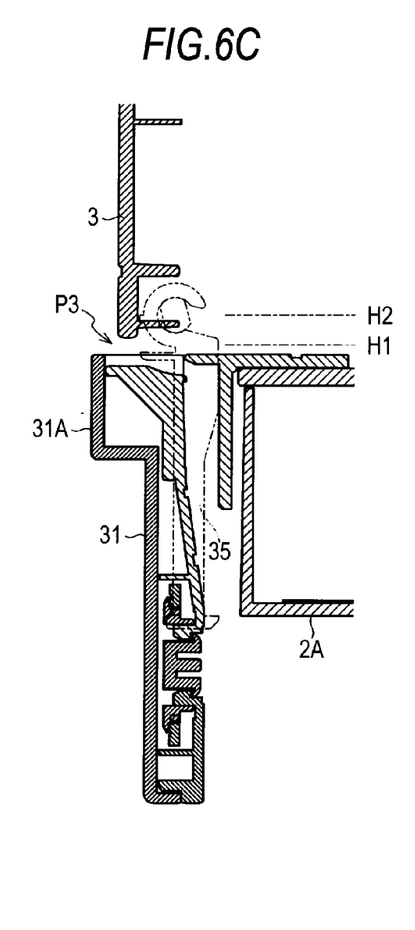

For this reason, in the present embodiment, the top cover 3 is displaced to the second position, so that the supporting members 35 are displaced by the above described effect of the cam member 37, whereby the rotation center of the top cover 3 rises from the descent position H1 to an ascent position H2 as shown in FIG. 6C. Therefore, at a position P3 shown in FIG. 6C, since a sufficient clearance is secured between the top cover 3 and the lid member 31, interference between the top cover 3 and the lid member 31 does not occur, and thus it is not feared that the top cover 3 and the lid member 31 might be damaged.

Figure 4A:
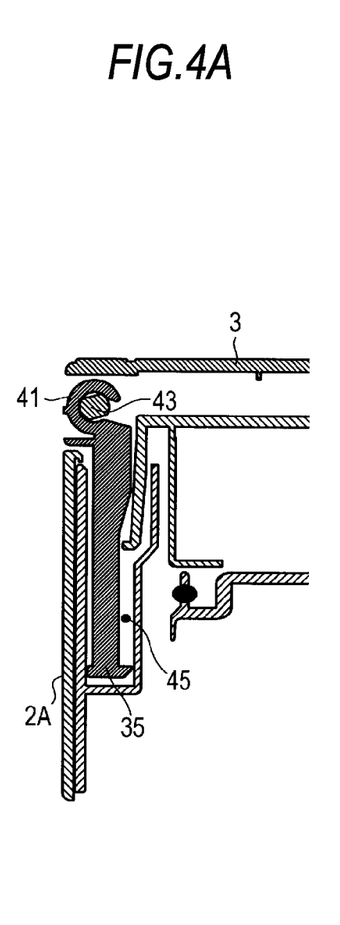
FIGS. 4A to 4D are explanatory views illustrating the positional relationship between a top cover which is opened and closed, and supporting members.
Figure 4B:
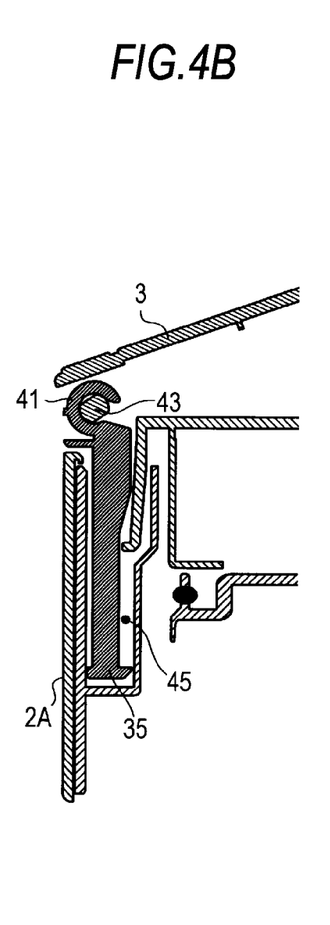
Figure 4C:
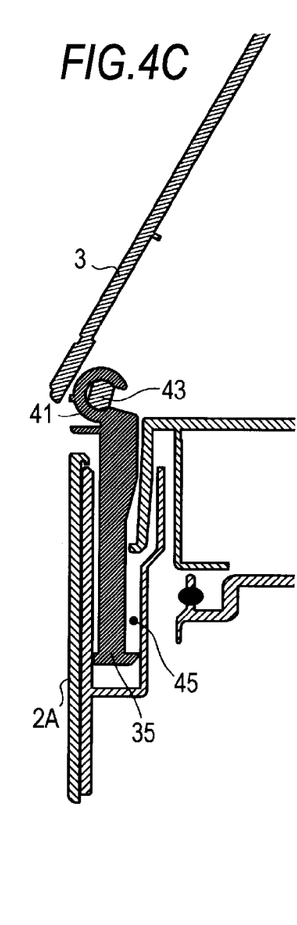

In other words, in the present embodiment, the top cover 3 and the lid member 31 have shapes set such that if the rotation center of the top cover 3 is fixed at the position shown in FIG. 4A, they interfere with each other. However, the top cover 3 is configured such that the rotation center of the top cover 3 rises as the top cover 3 is displaced to the second position. Therefore, interference between the top cover 3 and the lid member 31 is suppressed.

Figure 4D:
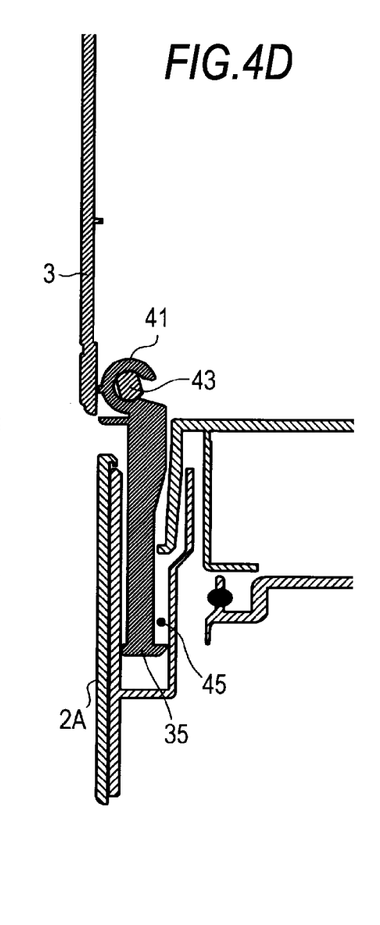

Also, this interference between the top cover 3 and the lid member 31 can be suppressed by fixing the rotation center of the top cover 3 at the position shown in FIG. 4D. However, in this case, even if the top cover 3 is displaced to the first position, since the rotation center of the top cover 3 does not lower, the height of the multi-function apparatus 1 increases, which is disadvantageous for making the apparatus thinner.

Also, if the rotation center of the top cover 3 is fixed at the position shown in FIG. 4D while the position of the upper end of the lid member 31 is maintained, since the lid member 31 is disposed more back, for a user who wants to hook the upper end of the lid member 31 from the front surface of the apparatus with a finger tip, the operability of the lid member 31 is reduced.

Further, even when the rotation center of the top cover 3 is fixed at the position shown in FIG. 4A, if the shape of the lid member 31 is changed, for example, the pull 31A is eliminated, or the pull 31A is moved to a position lower than the position shown in the drawings, it is possible to avoid interference with the top cover 3. However, in this measure, when the pull 31A is eliminated or the pull 31A is moved to a position more far side as seen from the user side, it causes the operability of the lid member 31 to be reduced.

Therefore, in order to comprehensively handle the above, a configuration like the above described embodiment is preferable, and the multi-function apparatus 1 exemplified in the above described embodiment can suppress not only interference between the top cover 3 and the lid member 31 but also a reduction in the operability of the lid member 31 while making the multi-function apparatus 1 thinner.

Also, when the top cover 3 is displaced to the second position, due to the effect of the cam member 37, the supporting members 35 are displaced to the ascent positions. After that, when the top cover 3 is displaced to the first position, it is depending on the thickness of a document mounted on the platen 11 how much the supporting members 35 lower.

That is, in a case where a document mounted on the platen 11 is sufficiently thin, the supporting members 35 lower to the descent positions shown in FIG. 4A; whereas in a case where a document is thick like a book document, the supporting members 35 does not lower to the descent positions shown in FIG. 4A. Consequently, the supporting members 35 fulfill a role not only in vertically moving the rotation center of the top cover 3 in cooperation with the cam member 37, but also in vertically move the top cover 3 according to the thickness of a document.

OTHER EMBODIMENTS

Although the embodiment of this disclosure has been described, this disclosure is not limited to the above described specific embodiment, but can be implemented in various forms.

For example, in the above described embodiment, the supporting members 35 are displaced between the descent positions and the ascent positions. However, as long as the supporting members are configured to be displaced between the descent positions and the ascent positions, whether to displace the supporting members to positions deviated from between the descent positions and the ascent positions during being displaced between the descent positions and the ascent positions is arbitrary. For example, even if the supporting members 35 are temporarily displaced to positions lower than the descent positions or higher than the ascent positions, during lowering or rising, there is no problem. Also, whether to raise and lower the supporting members 35 in proportion to the rotation angle of the cam member 37 is also arbitrary. For example, the shape of the cam member 37 may be set such that the supporting members 35 temporarily becomes a state where the supporting members does not rise or lower even if the rotation angle of the cam member 37 changes, during being lowering or rising.

Also, in the above described embodiment, a top cover having only a function of cover the platen has been exemplified. However, as the top cover, an automatic document feeder (ADF) may be incorporated. Even in this case, it is possible to use the configuration of this disclosure.

Also, in the above described embodiment, the abutting member 39 of the main body 2 is made of a resin material having a sliding property higher than portions except for a sliding part. However, the cam member 37 may be made of a resin material having a superior sliding property, or both of the cam member 37 and the abutting member 39 are made of resin materials having superior sliding properties. Further, whether to make the cam member 37 or the abutting member 39 of a resin material having a superior sliding property is arbitrary in this disclosure. In a case where the cam member 37 or the abutting member 39 is made of a resin material equivalent to that of the main body 2 or the top cover 3, grease may be applied to its sliding surface, thereby improving the sliding properties of the cam member 37 and the abutting member 39.

Also, in the above described embodiment, the configuration as a flatbed type image scanner device is provided as the first image processing unit 10, and the configuration as an inkjet type printer device is provided as the second image processing unit 20. However, this configuration may also be appropriately changed. For example, as the second image processing unit 20, an electrophotographic image forming means may be provided.

What is claimed is:

1. An image processing apparatus comprising:
a main body comprising a first image processing unit;
a cover configured to be movable between a first position, in which a top of the main body is covered, and a second position, in which the top of the main body is exposed;
a supporting member configured to support the cover in a state where the cover is rotatable to the first position and the second position, and the supporting member configured to vertically move with respect to the main body so that a rotation center of the cover is moved between an ascent position and a descent position; and
a cam configured to rotate together with the cover such that a cam surface, whose distance from the rotation center of the cover varies according to a rotation angle of the cam, abuts the main body, thereby vertically moving the supporting member with respect to the main body,
wherein the cam has a shape to displace the rotation center of the cover to the descent position when the cover rotates to the first position and to displace the rotation center of the cover to the ascent position when the cover rotates to the second position so that interference of the cover is suppressed.

2. The image processing apparatus according to claim 1, wherein, after the cover starts to be moved from the first position to the second position, the cam surface of the cam does not abut the main body until the cam reaches a predetermined rotation angle, and
wherein, when the cover is displaced to a position where the cam exceeds the predetermined rotation angle, the cam surface abuts the main body thereby raising the rotation center of the cover.

3. The image processing apparatus according to claim 1, wherein the first image processing unit comprises a platen on which a document is mounted, and a reading unit which reads images of the document mounted on the platen while moving along the platen,
wherein the cover is moved to the first position and covers the platen provided at the top of the main body, and
wherein the cover is moved to the second position and exposes the platen.

4. The image processing apparatus according to claim 3, wherein, on a surface of the cover facing the platen, an elastic member is provided to be elastically deformed.

5. The image processing apparatus according to claim 1, wherein, the supporting member is configured to be inserted into an insertion portion formed on the main body and is supported to be vertically movable inside the insertion portion by the main body.

6. The image processing apparatus according to claim 1, wherein, in one of the main body and the cam, a portion configured to be a contact surface contacting with the other one of the main body and the cam is made of a material having a sliding property higher than other portions except for the portion configured to be the contact surface.

7. The image processing apparatus according to claim 1, wherein the main body comprises a second image processing unit provided below the first image processing unit, and
wherein main body defines an aperture connecting an outside of the main body with the second image processing unit.

8. The image processing apparatus according to claim 7, wherein the second image processing unit comprises an image forming unit to form images on recording media, and
wherein the image processing apparatus is configured to feed the recording media from the outside of the main body to the image forming unit through the aperture.

9. The image processing apparatus according to claim 1, wherein the supporting members are provided at two positions which are at an upper portion of one side of a casing included in the main body, and the supporting members are separated from each other in a direction perpendicular to both of a direction perpendicular to the one side and a vertical direction, respectively,
wherein a lid is provided on the one side of the casing of the main body, and the lid is rotatable around a lower end of the lid serving as its rotation axis, and
wherein the lid is interposed between the supporting members separated from each other in the direction perpendicular to both of the direction perpendicular to the one side and the vertical direction.

* * * * *